US008412872B1

(12) United States Patent
Wagner et al.

(10) Patent No.: US 8,412,872 B1
(45) Date of Patent: *Apr. 2, 2013

(54) CONFIGURABLE GPU AND METHOD FOR GRAPHICS PROCESSING USING A CONFIGURABLE GPU

(75) Inventors: Barry A. Wagner, San Jose, CA (US); Anthony Michael Tamasi, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 241 days.

This patent is subject to a terminal disclaimer.

(21) Appl. No.: 11/301,960

(22) Filed: Dec. 12, 2005

(51) Int. Cl.
*G06F 13/00* (2006.01)

(52) U.S. Cl. .................. 710/300; 710/2; 710/8; 710/36; 710/305

(58) Field of Classification Search .................. 710/10, 710/11, 14, 15, 2, 106, 305, 62, 8; 326/30, 326/39, 41, 85, 86; 365/108, 307, 333
See application file for complete search history.

(56) References Cited

U.S. PATENT DOCUMENTS

| 3,940,740 A | | 2/1976 | Coontz |
| 4,541,075 A | * | 9/1985 | Dill et al. .................. 365/189.04 |
| 4,773,044 A | | 9/1988 | Sfarti et al. |
| 4,885,703 A | | 12/1989 | Deering |
| 4,951,220 A | | 8/1990 | Ramacher et al. |
| 4,985,988 A | | 1/1991 | Littlebury |
| 5,036,473 A | | 7/1991 | Butts et al. |
| 5,125,011 A | | 6/1992 | Fung |
| 5,276,893 A | | 1/1994 | Savaria |
| 5,379,405 A | | 1/1995 | Ostrowski |
| 5,392,437 A | | 2/1995 | Matter et al. |
| 5,448,496 A | | 9/1995 | Butts et al. |
| 5,455,536 A | | 10/1995 | Kono et al. |
| 5,513,144 A | | 4/1996 | O'Toole |
| 5,513,354 A | | 4/1996 | Dwork et al. |
| 5,578,976 A | | 11/1996 | Yao |
| 5,630,171 A | | 5/1997 | Chejlava, Jr. et al. |
| 5,634,107 A | | 5/1997 | Yumoto et al. |
| 5,638,946 A | | 6/1997 | Zavracky |
| 5,671,376 A | * | 9/1997 | Bucher et al. .................. 710/305 |

(Continued)

FOREIGN PATENT DOCUMENTS

| TW | 093127712 | 7/2005 |
| WO | 2004030127 | 4/2004 |
| WO | 2005029329 | 3/2005 |

OTHER PUBLICATIONS

PCI Express Card Electromechanical Specification Rev. 1.1, 2005, p. 87.*

(Continued)

*Primary Examiner* — Henry Tsai
*Assistant Examiner* — Titus Wong

(57) ABSTRACT

The present invention pertains to a graphics processing unit. The graphics processing unit includes a graphics processing core configured for graphics processing. A single-ended I/O interface configured to implement single-ended communication with a frame buffer memory is included in the graphics processing unit. The graphics processing unit further includes a differential I/O interface having a first portion and a second portion. In a first configuration, the first portion and the second portion implement a PCI-Express interface with a computer system. In a second configuration, the first portion implements a PCI-Express interface with the computer system and the second portion implements differential communication with a coupled device.

21 Claims, 6 Drawing Sheets

U.S. PATENT DOCUMENTS

| | | | |
|---|---|---|---|
| 5,694,143 | A | 12/1997 | Fielder et al. |
| 5,705,938 | A | 1/1998 | Kean |
| 5,766,979 | A | 6/1998 | Budnaitis |
| 5,768,178 | A | 6/1998 | McLaury |
| 5,805,833 | A | 9/1998 | Verdun |
| 5,884,053 | A | 3/1999 | Clouser et al. |
| 5,896,391 | A | 4/1999 | Solheim et al. |
| 5,909,595 | A | 6/1999 | Rosenthal et al. |
| 5,913,218 | A | 6/1999 | Carney et al. |
| 5,937,173 | A | 8/1999 | Olarig et al. |
| 5,956,252 | A | 9/1999 | Lau et al. |
| 5,996,996 | A | 12/1999 | Brunelle |
| 5,999,990 | A | 12/1999 | Sharrit et al. |
| 6,003,100 | A | 12/1999 | Lee |
| 6,049,870 | A | 4/2000 | Greaves |
| 6,065,131 | A | 5/2000 | Andrews et al. |
| 6,067,262 | A | 5/2000 | Irrinki et al. |
| 6,069,540 | A | 5/2000 | Berenz et al. |
| 6,072,686 | A | 6/2000 | Yarbrough |
| 6,085,269 | A * | 7/2000 | Chan et al. ............... 710/100 |
| 6,094,116 | A | 7/2000 | Tai et al. |
| 6,219,628 | B1 | 4/2001 | Kodosky et al. |
| 6,249,288 | B1 | 6/2001 | Campbell |
| 6,255,849 | B1 | 7/2001 | Mohan |
| 6,307,169 | B1 | 10/2001 | Sun et al. |
| 6,323,699 | B1 * | 11/2001 | Quiet ............... 327/108 |
| 6,348,811 | B1 | 2/2002 | Haycock et al. |
| 6,363,285 | B1 | 3/2002 | Wey |
| 6,363,295 | B1 | 3/2002 | Akram et al. |
| 6,370,603 | B1 | 4/2002 | Silverman et al. |
| 6,377,898 | B1 | 4/2002 | Steffan et al. |
| 6,388,590 | B1 | 5/2002 | Ng |
| 6,389,585 | B1 | 5/2002 | Masleid et al. |
| 6,392,431 | B1 | 5/2002 | Jones |
| 6,429,288 | B1 | 8/2002 | Esswein et al. |
| 6,429,747 | B2 | 8/2002 | Franck et al. |
| 6,433,657 | B1 | 8/2002 | Chen |
| 6,437,657 | B1 | 8/2002 | Jones |
| 6,486,425 | B2 | 11/2002 | Seki |
| 6,504,841 | B1 | 1/2003 | Larson et al. |
| 6,530,045 | B1 | 3/2003 | Cooper et al. |
| 6,535,986 | B1 | 3/2003 | Rosno et al. |
| 6,598,194 | B1 | 7/2003 | Madge et al. |
| 6,629,181 | B1 * | 9/2003 | Alappat et al. ............... 710/300 |
| 6,662,133 | B2 | 12/2003 | Engel et al. |
| 6,700,581 | B2 | 3/2004 | Baldwin et al. |
| 6,701,466 | B1 | 3/2004 | Fiedler |
| 6,717,474 | B2 | 4/2004 | Chen et al. |
| 6,718,496 | B1 | 4/2004 | Fukuhisa et al. |
| 6,734,770 | B2 | 5/2004 | Aigner et al. |
| 6,738,856 | B1 | 5/2004 | Milley et al. |
| 6,741,258 | B1 | 5/2004 | Peck, Jr. et al. |
| 6,747,483 | B2 * | 6/2004 | To et al. ............... 326/86 |
| 6,782,587 | B2 | 8/2004 | Reilly |
| 6,788,101 | B1 * | 9/2004 | Rahman ............... 326/30 |
| 6,794,101 | B2 | 9/2004 | Liu et al. |
| 6,806,788 | B1 | 10/2004 | Marumoto |
| 6,823,283 | B2 | 11/2004 | Steger et al. |
| 6,825,847 | B1 | 11/2004 | Molnar et al. |
| 6,849,924 | B2 | 2/2005 | Allison et al. |
| 6,850,133 | B2 | 2/2005 | Ma |
| 6,879,207 | B1 | 4/2005 | Nickolls |
| 6,938,176 | B1 | 8/2005 | Alben et al. |
| 6,956,579 | B1 | 10/2005 | Diard et al. |
| 6,982,718 | B2 | 1/2006 | Kilgard et al. |
| 7,020,598 | B1 | 3/2006 | Jacobson |
| 7,058,738 | B2 | 6/2006 | Stufflebeam, Jr. |
| 7,069,369 | B2 | 6/2006 | Chou et al. |
| 7,069,458 | B1 | 6/2006 | Sardi et al. |
| 7,075,542 | B1 | 7/2006 | Leather |
| 7,075,797 | B1 * | 7/2006 | Leonard et al. ............... 361/803 |
| 7,085,824 | B2 | 8/2006 | Forth et al. |
| 7,136,953 | B1 | 11/2006 | Bisson et al. |
| 7,170,315 | B2 | 1/2007 | Bakker et al. |
| 7,174,407 | B2 * | 2/2007 | Hou et al. ............... 710/301 |
| 7,174,411 | B1 * | 2/2007 | Ngai ............... 710/316 |
| 7,185,135 | B1 | 2/2007 | Briggs et al. |
| 7,187,383 | B2 | 3/2007 | Kent |
| 7,246,274 | B2 | 7/2007 | Kizer et al. |
| 7,260,007 | B2 * | 8/2007 | Jain et al. ............... 365/212 |
| RE39,898 | E | 10/2007 | Nally et al. |
| 7,293,127 | B2 * | 11/2007 | Caruk ............... 710/305 |
| 7,305,571 | B2 | 12/2007 | Cranford, Jr. et al. |
| 7,324,458 | B2 | 1/2008 | Schoenborn et al. |
| 7,340,541 | B2 | 3/2008 | Castro et al. |
| 7,398,336 | B2 | 7/2008 | Feng et al. |
| 7,415,551 | B2 | 8/2008 | Pescatore |
| 7,424,564 | B2 * | 9/2008 | Mehta et al. ............... 710/301 |
| 7,480,808 | B2 * | 1/2009 | Caruk et al. ............... 713/300 |
| 7,525,986 | B2 * | 4/2009 | Lee et al. ............... 370/462 |
| 7,594,061 | B2 * | 9/2009 | Shen et al. ............... 710/317 |
| 7,663,633 | B1 * | 2/2010 | Diamond et al. ............... 345/503 |
| 7,782,325 | B2 * | 8/2010 | Gonzalez et al. ............... 345/505 |
| 7,793,029 | B1 * | 9/2010 | Parson et al. ............... 710/306 |
| 8,132,015 | B1 | 3/2012 | Wyatt |
| 2002/0005729 | A1 | 1/2002 | Leedy |
| 2002/0026623 | A1 | 2/2002 | Morooka |
| 2002/0031025 | A1 | 3/2002 | Shimano et al. |
| 2002/0158869 | A1 | 10/2002 | Ohba et al. |
| 2003/0020173 | A1 | 1/2003 | Huff et al. |
| 2003/0046472 | A1 | 3/2003 | Morrow |
| 2003/0051091 | A1 | 3/2003 | Leung et al. |
| 2003/0061409 | A1 | 3/2003 | RuDusky |
| 2003/0093506 | A1 | 5/2003 | Oliver et al. |
| 2003/0115500 | A1 | 6/2003 | Akrout et al. |
| 2003/0164830 | A1 | 9/2003 | Kent |
| 2004/0012082 | A1 | 1/2004 | Dewey et al. |
| 2004/0012597 | A1 | 1/2004 | Zatz et al. |
| 2004/0064628 | A1 * | 4/2004 | Chiu ............... 710/315 |
| 2004/0085313 | A1 | 5/2004 | Moreton et al. |
| 2004/0102187 | A1 | 5/2004 | Moller et al. |
| 2004/0183148 | A1 | 9/2004 | Blasko, III |
| 2004/0188781 | A1 | 9/2004 | Bar |
| 2004/0227599 | A1 | 11/2004 | Shen et al. |
| 2005/0041031 | A1 * | 2/2005 | Diard ............... 345/505 |
| 2005/0044284 | A1 | 2/2005 | Pescatore |
| 2005/0045722 | A1 | 3/2005 | Park |
| 2005/0060601 | A1 | 3/2005 | Gomm |
| 2005/0088445 | A1 * | 4/2005 | Gonzalez et al. ............... 345/502 |
| 2005/0173233 | A1 | 8/2005 | Kaelberer |
| 2005/0182881 | A1 | 8/2005 | Chou et al. |
| 2005/0237083 | A1 | 10/2005 | Bakker et al. |
| 2005/0246460 | A1 | 11/2005 | Stufflebeam |
| 2005/0285863 | A1 * | 12/2005 | Diamond ............... 345/519 |
| 2006/0055641 | A1 * | 3/2006 | Robertus et al. ............... 345/82 |
| 2006/0106911 | A1 * | 5/2006 | Chapple et al. ............... 709/200 |
| 2006/0123177 | A1 * | 6/2006 | Chan et al. ............... 710/306 |
| 2006/0190663 | A1 | 8/2006 | Lu |
| 2006/0221086 | A1 | 10/2006 | Diard |
| 2006/0252285 | A1 * | 11/2006 | Shen ............... 439/43 |
| 2006/0267981 | A1 | 11/2006 | Naoi |
| 2006/0267987 | A1 * | 11/2006 | Litchmanov ............... 345/502 |
| 2006/0282604 | A1 * | 12/2006 | Temkine et al. ............... 710/314 |
| 2007/0038794 | A1 * | 2/2007 | Purcell et al. ............... 710/306 |
| 2007/0067535 | A1 * | 3/2007 | Liu ............... 710/300 |
| 2007/0088877 | A1 * | 4/2007 | Chen et al. ............... 71/71 |
| 2007/0115271 | A1 * | 5/2007 | Seo et al. ............... 345/204 |
| 2007/0115290 | A1 | 5/2007 | Polzin et al. |
| 2007/0115291 | A1 * | 5/2007 | Chen et al. ............... 345/506 |

OTHER PUBLICATIONS

Zimmermann, "OSI Reference Model—The ISO Model of Architecture for Open Systems Interconnection," IEEE Transactions on Communications, Apr. 1980.

Richard Shoup, "Superpaint: An Early Frame Buffer Graphics System," IEEE Annals of the History of Computing, copyright 2001.

Kuroda et al., "Multimedia Processors," Proceedings of the IEEE, Jun. 1998.

Welch, D. "Building Self-Reconfiguring Distributed Systems Using Compensating Reconfiguration", Proceedings Fourth International Journal Conference on Configurable Distributed Systems, May 4-6, 1998, pp. 18-25.

Eckert, et al; Functional Component Coordinated Reconfiguration System and Method; U.S. Appl. No. 11/454,313; Filing date: Jun. 16, 2006.

Diamond, A Semiconductor Die Micro Electro-Mechanical Switch Management System; U.S. Appl. No. 10/942,209; Filing Date: Sep. 15, 2004.

Diamond, et al; A System and Method for Remotely Configuring Semiconductor Functional Circuits; U.S. Appl. No. 10/740,779; Filing date: Dec. 18, 2003.

Van Dyke, et al; A System and Method For Increasing Die Yield; U.S. Appl. No. 10/740,723; Filing date: Dec. 18, 2003.

Diamond, et al; A System and Method for Configuring Semiconductor Functional Circuits; U.S. Appl. No. 10/740,722; Filing date: Dec. 18, 2003.

Van Dyke, et al; An Integrated Circuit Configuration System and Method; U.S. Appl. No. 10/740,721; Filing date: Dec. 18, 2003.

Diamond; Micro Electro Mechinical Switch System and Method for Testing and Configuring Semiconductor Functional Circuits; U.S. Appl. No. 10/942,169; Filing date: Sep. 15, 2004.

Diamond; A System and Method for Configuring Semiconductor Functional Circuits; U.S. Appl. No. 10/876,340, Filing date: Jun. 23, 2004.

International Search Report. PCT/US2004/030127. Mail Date Jun. 30, 2005.

PCT International Preliminary Report on Patentability. PCT/US2004/030127. International Filing Date Sep. 13, 2004.

European Patent Office E-Space Family List for: WO 2005/29329 (PCT/US 2004/030127).

Zorian, "Test Requirements for Embedded Core-based Systems and IEEE P1500", International Test Conference, copyright IEEE 1997.

Sgroi et al., "Addressing the System-on-a-Chip Interconnect Woes Through Communication Based Design", DAC 2001, Jun. 18-22, 2001, copyright ACM.

Test Requirements for Embedded Core-Based Systems and IEEE P1500' by Yervant Zorian, International Test Conference, copyright IEEE 1997.

Addressing the System-on-a-Chip Interconnect Woes Through Communication-Based Design' by Sgroi et al., DAC 2001, Jun. 18-22, 2001, copyright ACM.

\* cited by examiner

CONFIGURABLE GPU AND METHOD FOR GRAPHICS PROCESSING USING A CONFIGURABLE GPU

FIELD OF THE INVENTION

The field of the present invention pertains to electronic integrated circuits, and more particularly to graphics processing units.

BACKGROUND OF THE INVENTION

Until recently, computer systems have primarily utilized single-ended buses and interfaces. Single-ended signaling involves varying voltage with respect to a reference voltage, which is sometimes referred to as "ground," to signal a logical "1" or "0." When running multiple signals with respect to the same ground, single-ended signaling provides a cost-effective solution as it only requires one wire per signal.

Despite being less expensive to integrate, there are downsides to single-ended signaling that limit its performance potential. For example, multiple signals sharing the same ground path can lead to crosstalk. Also, differences between ground path and signal path length, coupled with the higher current in the ground path due to signal return-current sharing, can lead to ground potential variations throughout the system. These variations in the reference potential then translate into signaling errors given that the signal potential does not similarly vary with the ground potential. And given that the signal and ground paths do not run in the same proximity to one another, noise injected on the signal path is not similarly injected on the ground path, making single-ended signaling more susceptible to noise. Consequently, in order to maintain a sufficient signal-to-noise ratio, the signal voltages must remain relatively high. High signal voltages require higher transmission power, ultimately limiting transmission distance. And even more importantly, the higher rise and fall times of the higher signal voltages limit interface speed and bandwidth. Given these disadvantages, the computer industry is slowly moving toward differential signaling.

Differential signaling involves the use of two equal-length wires or traces, where each wire carries a mirror of the signal on the other wire. Subtraction of these signals is used to signal a logical "1" or "0." Since each pair of wires or traces uses its own return path, crosstalk among signals is minimized. Also, equal-length signal paths minimize relative potential differences, providing more consistent readings as path length is varied. Finally, the two wires or traces can be run close to one another, thereby allowing common-mode noise to be cancelled when the signals are subtracted. Given that differential signaling is less susceptible to noise, lower voltages can be used to save transmitting power and allow the use of longer paths or traces. Also, the lower voltages allow higher interface speed and bandwidth given the smaller rise and fall times of the signal.

Having acknowledged the advantages of differential signaling, the computer industry is beginning to shift from single-ended interfaces to differential interfaces. For example, while the latest single-ended PCI interface (e.g., PCI-X 533) offers a theoretical bandwidth of 4.3 GB/s, the sustained bandwidth has shown to be much more modest. Moreover, the speed (e.g., 533 MHz for PCI-X 533) and additional hardware (e.g., almost twice as many pins used in the 64-bit PCI-X interfaces compared to the 32-bit PCI interfaces) used in the PCI-X interface makes it very costly to implement. As such, although PCI and PCI-X were adequate for some time, the need for increased performance at a lower cost has spurred the transition to the latest, full-duplex PCI-Express interface that enables bandwidths up to 8 GB/s in a x16 configuration. And in the future, higher speeds and wider configurations will offer even more bandwidth to accommodate expected computing needs.

Similarly, the computer industry is beginning to realize the need for differential interfaces to display rendered image data. As such, manufacturers are beginning to move from single-ended display interfaces, such as RGB, to differential display interfaces, such as Displayport.

However, the transition to differential signaling will not occur immediately, thereby requiring microprocessor manufacturers to implement backward compatibility with single-ended peripherals. For example, manufacturers of graphics processing units (GPUs) generally agree that differential frame buffer memory offers significant performance improvements over single-ended frame buffer memory, but realize that a market still exists for single-ended I/O interfaces since the transition to differential I/O is in its early stages. Thus, manufacturers desiring to capture both markets are forced to either make a separate GPU solely with a differential I/O interface, or increase the size of the existing single-ended I/O GPU designs to accommodate a differential I/O interface with frame buffer memory. The former alternative is costly as it requires the research, design, and manufacture of a new product. The latter alternative is equally as expensive as it increases both the size and complexity of the integrated circuit devices.

Thus, a need exists for a GPU with a differential interface for coupled devices that maintains backward compatibility with single-ended frame buffer memory without increasing the size, complexity, or cost of the integrated circuit device. The present invention provides a novel solution to these requirements.

SUMMARY OF THE INVENTION

Embodiments of the present invention provide a GPU and method for graphics processing configurable for differential communication with coupled devices (e.g., differential frame buffer memory, differential displays, etc.) and single-ended frame buffer memory. And in contrast to prior art solutions to this problem, embodiments of the present invention provide these benefits without significantly increasing the size, complexity, and cost of the integrated circuit device.

In one embodiment, the present invention is implemented as a GPU. The GPU has both a differential I/O interface and a single-ended I/O interface. The differential I/O interface allows the GPU to implement high-bandwidth, differential communication with coupled devices to accommodate future computing and graphics processing needs. The single-ended I/O interface allows the GPU to maintain backward compatibility with existing single-ended frame buffer memory.

The GPU of the present invention has both a first configuration and a second configuration. In the first configuration, the single-ended I/O interface is implemented to communicate with single-ended frame buffer memory, while the entire differential I/O interface with the computer system may be implemented in accordance with the PCI EXPRESS® interface format or standard, referred to herein as "PCI-Express." In a second configuration, the differential I/O interface is partitioned into a first portion and a second portion. The first portion implements a PCI-Express interface with the computer system while the second portion implements differential communication with coupled devices.

In this manner, embodiments of the present invention allow the manufacturer to research, design, and manufacture a single integrated circuit device to be used in products with either single-ended or differential frame buffer memory. Accordingly, the manufacturer may tap future markets surrounding differential devices, while still satisfying the existing markets utilizing single-ended frame buffer memory. In addition to avoiding the cost of producing multiple integrated circuit devices, the present invention allows the manufacturer to leverage differential I/O not used for the PCI-Express interface to produce a differential I/O interface to communicate with coupled devices. As such, the manufacturer is not required to increase the size or complexity of the integrated circuit device, thereby realizing additional cost savings.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
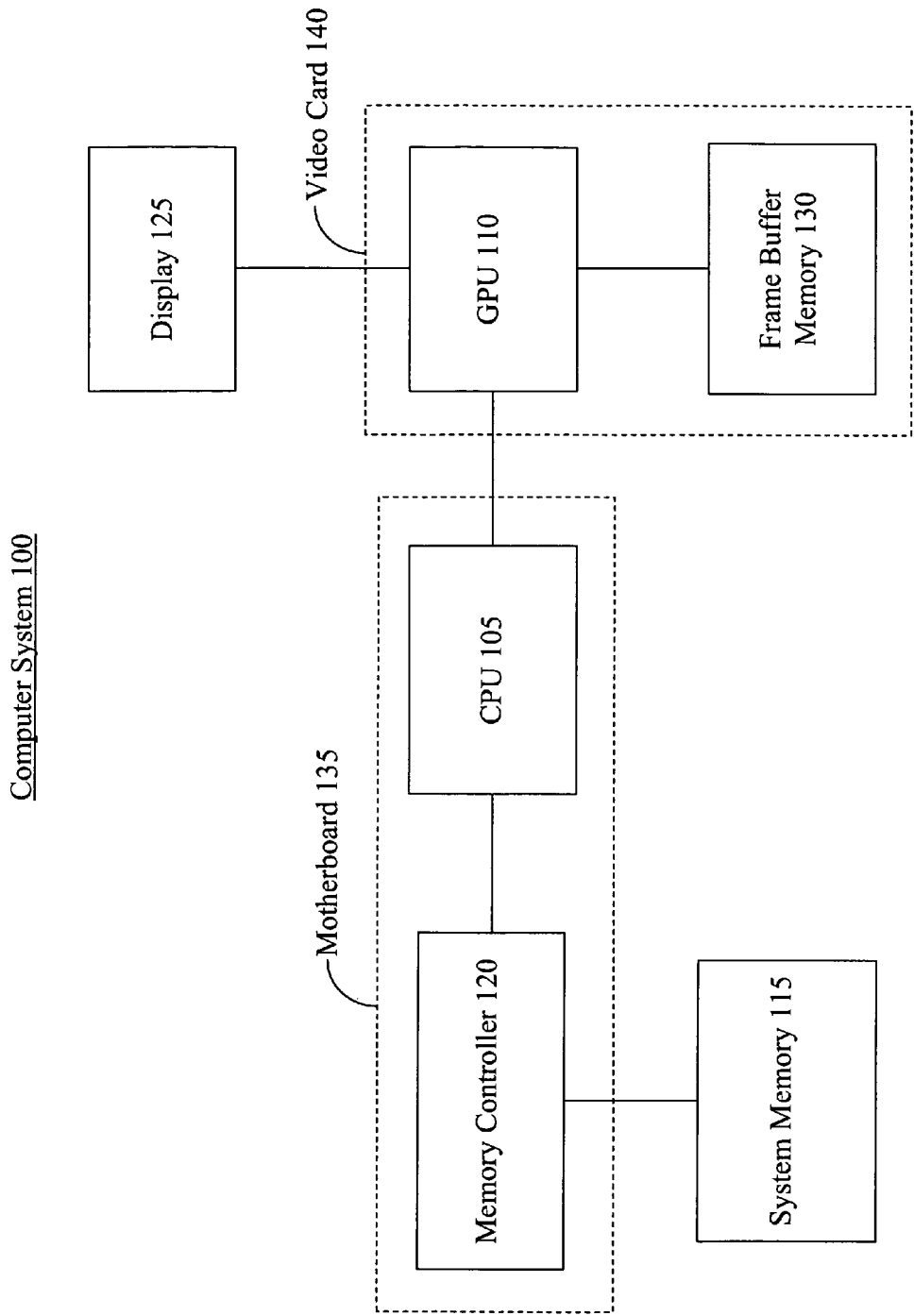
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention provide a GPU and method for graphics processing configurable for operation with both differential devices and single-ended frame buffer memory. And in contrast to prior art solutions to this problem, embodiments of the present invention provide these benefits without increasing the size, complexity, or cost of the integrated circuit device. Embodiments of the present invention and their benefits are further described below.

Notation and Nomenclature:

Some portions of the detailed descriptions that follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer-executed step, logic block, process, etc., is here and generally conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions of the present invention, it is appreciated that the use of terms such as "processing" or "accessing" or "executing" or "storing" or "rendering" or "implementing" or "selecting" or "configuring" or the like, refer to the actions and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission, or display devices.

Computer System Platform:

FIG. 1 shows computer system 100 in accordance with one embodiment of the present invention. Computer system 100 depicts components of a basic computer system in accordance with one embodiment of the present invention that provides the execution platform for implementing certain hardware-based and software-based functionality of the present invention. As described above, certain processes and steps of the present invention are realized, in one embodiment, as a series of instructions (e.g., a software program) that reside within computer readable memory units of a computer system (e.g., system 100) and are executed by the CPU of system 100. When executed, the instructions cause computer system 100 to implement the functionality of the present invention as described below.

In general, computer system 100 comprises at least one CPU 105 coupled to graphics processing unit (GPU) 110 and system memory 115 via one or more buses as shown. Access to system memory 115 is implemented by memory controller 120. GPU 110 is coupled to display 125 and frame buffer memory 130.

As shown in FIG. 1, in one embodiment of the present invention, system 100 may be implemented as a desktop computer system or server computer system having a powerful general-purpose CPU 105 located on motherboard 135, which is coupled to a dedicated graphics rendering GPU 110 located on video card 140. In such an embodiment, CPU 105, memory controller 120, and system memory 115 are removably coupled to motherboard 135. Also, GPU 110 and frame buffer memory 130 are removably coupled to video card 140, where video card 140 is removably coupled to motherboard 135. However, in other embodiments, these elements may be more rigidly affixed to motherboard 135 and video card 140 by soldering or the like. In the embodiments where computer system 100 is a desktop computer system or a server computer system, components would be included that are designed to add peripheral buses, specialized graphics memory and system memory, I/O devices, and the like.

In other embodiments, computer system 100 may be configured such that CPU 105, GPU 110, system memory 115, memory controller 120, and frame buffer memory 130 are all removably coupled to the same device or circuit card. In other embodiments, these elements may be more rigidly affixed to the device or circuit card by soldering or the like. And in other embodiments, the elements of system 100 shown in FIG. 1 may be arranged or grouped in many other configurations. As such, it should be appreciated that although GPU 110 is depicted in FIG. 1 as implemented on video card 140, GPU 110 may be implemented, for example, as a discrete component, as a discrete integrated circuit die (e.g., mounted directly on the motherboard), or as an integrated GPU included within the integrated circuit die of a computer system chipset component (e.g., integrated within a Northbridge chip). It should also be noted that although memory controller 120 is depicted as implemented on motherboard 135, it may also be implemented, for example, as a discrete component or as an integrated memory controller within a different component (e.g., within the CPU 105, GPU 110, etc.) of system 100. Similarly, system 100 can be implemented as a set-top video game console device such as, for example, the XBOX®, available from MICROSOFT® Corporation of Redmond, Wash., or the PLAYSTATION®3 available from SONY® Computer Entertainment Corporation of Tokyo, Japan.

Embodiments of the Invention

Figure 2:
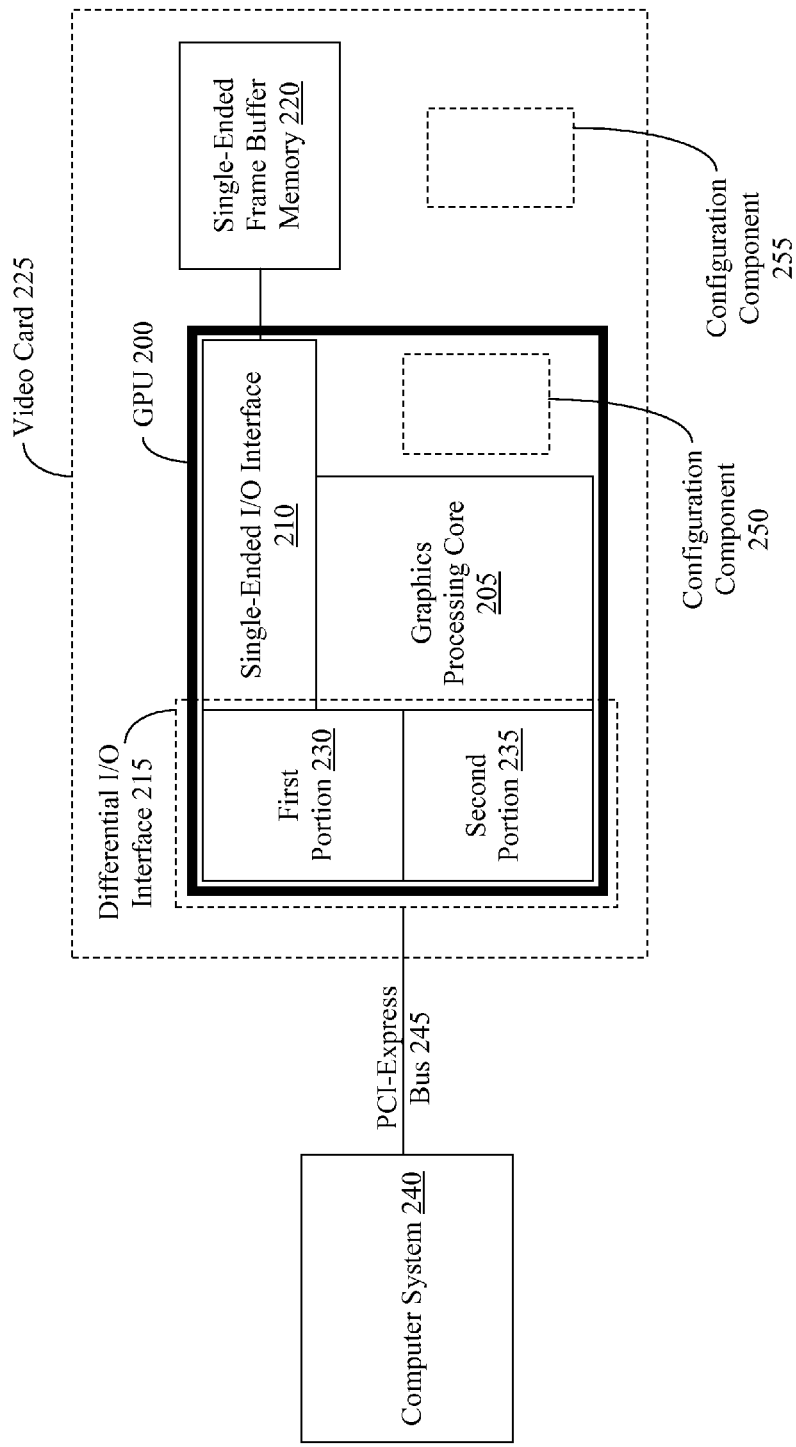
FIG. 2 shows a GPU in a first configuration in accordance with one embodiment of the present invention.

FIG. 2 shows GPU 200 in a first configuration in accordance with one embodiment of the present invention. GPU 200 is comprised of graphics processing core 205, single-ended I/O interface 210, and differential I/O interface 215.

Graphics processing core 205 is comprised of hardware optimized for real-time three-dimensional graphics rendering. More specifically, graphics processing core 205 comprises two or more graphics rendering pipelines configured to accept image data, and render the image data for display on a display device (e.g., CRT, LCD, etc.).

In the first configuration shown in FIG. 2, single-ended I/O interface 210 communicates with single-ended frame buffer memory 220 using single-ended signaling to perform graphics processing operations. As such, GPU 200 may be integrated into products employing single-ended frame buffer memory. One such product utilizing single-ended frame buffer memory is video card 225 shown in FIG. 2. However, it should be noted that in other embodiments GPU 200 may be implemented as a discrete component, as a discrete integrated circuit die, or as an integrated GPU included within the integrated circuit die of a computer system chipset component. Similarly, single-ended frame buffer memory 220 may be implemented in other embodiments as a discrete component, which is removably coupled to video card 225.

Differential I/O interface 215 of the embodiment shown in FIG. 2 is comprised of first portion 230 and second portion 235. In this first configuration, first portion 230 and second portion 235 combine to form a PCI-Express interface for communication with computer system 240 over PCI-Express bus 245. The PCI-Express interface transfers image data to graphics processing core 205 such that the image data may be rendered and displayed in accordance with embodiments of the present invention. Additionally, PCI-Express bus 245 may comprise any number of lanes up to 32, as discussed below, depending upon the bandwidth required for the given configuration.

Figure 3:
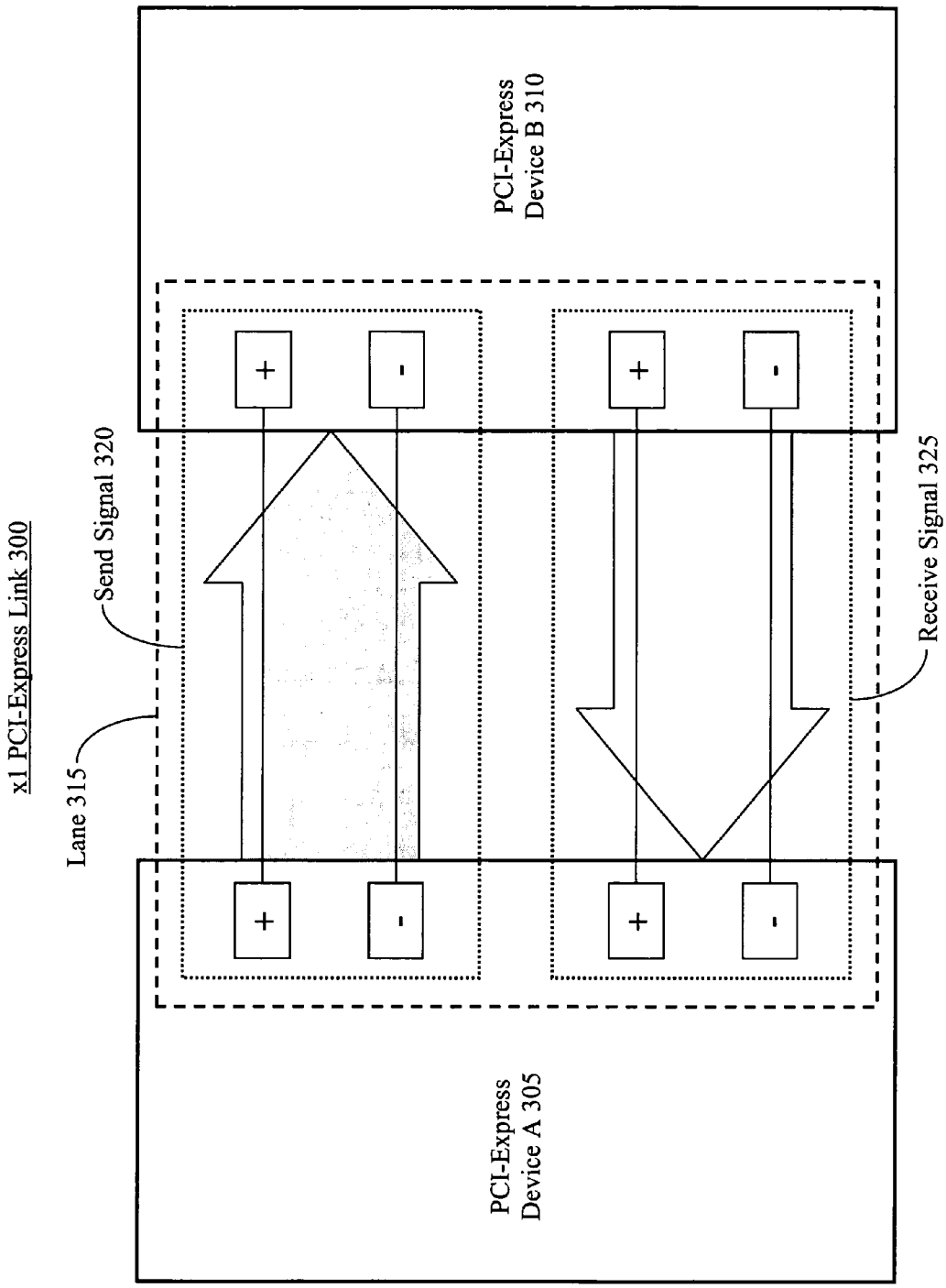
FIG. 3 shows x1 PCI-Express link connected between a first PCI-Express device and a second PCI-Express device in accordance with embodiments of the present invention.

FIG. 3 shows x1 PCI-Express link 300 connected between PCI-Express device A 305 and PCI-Express device B 310 in accordance with embodiments of the present invention. x1 PCI-Express link 300 has one lane 315, which is comprised of send signal 320 and receive signal 325. Send signal 320 represents the data flow from PCI-Express device A 305 and PCI-Express device B 310. Receive signal 325, on the other hand, represents the data flow from PCI-Express device B 310 to PCI-Express device A 305. In other embodiments, the PCI-Express links may contain more lanes for added bandwidth. For example, a x8 PCI-Express link would have eight lanes, and a x16 PCI-Express link would have 16 lanes. In such embodiments, the data packets get portioned out among the available PCI-Express lanes to enhance data transfer and fully utilize the available bandwidth.

Both send signal 320 and receive signal 325 shown in FIG. 3 utilize differential signaling. As such, data can be transferred much faster over PCI-Express interfaces than previous interfaces utilizing single-ended signaling. Moreover, bandwidth has increased to such an extent that certain interfaces do not require all of the available PCI-Express lanes. Consequently, embodiments of the present invention leverage these unneeded PCI-Express lanes to allow implementation and communication with coupled devices (e.g., differential frame buffer memory, differential displays, etc.).

Figure 4:
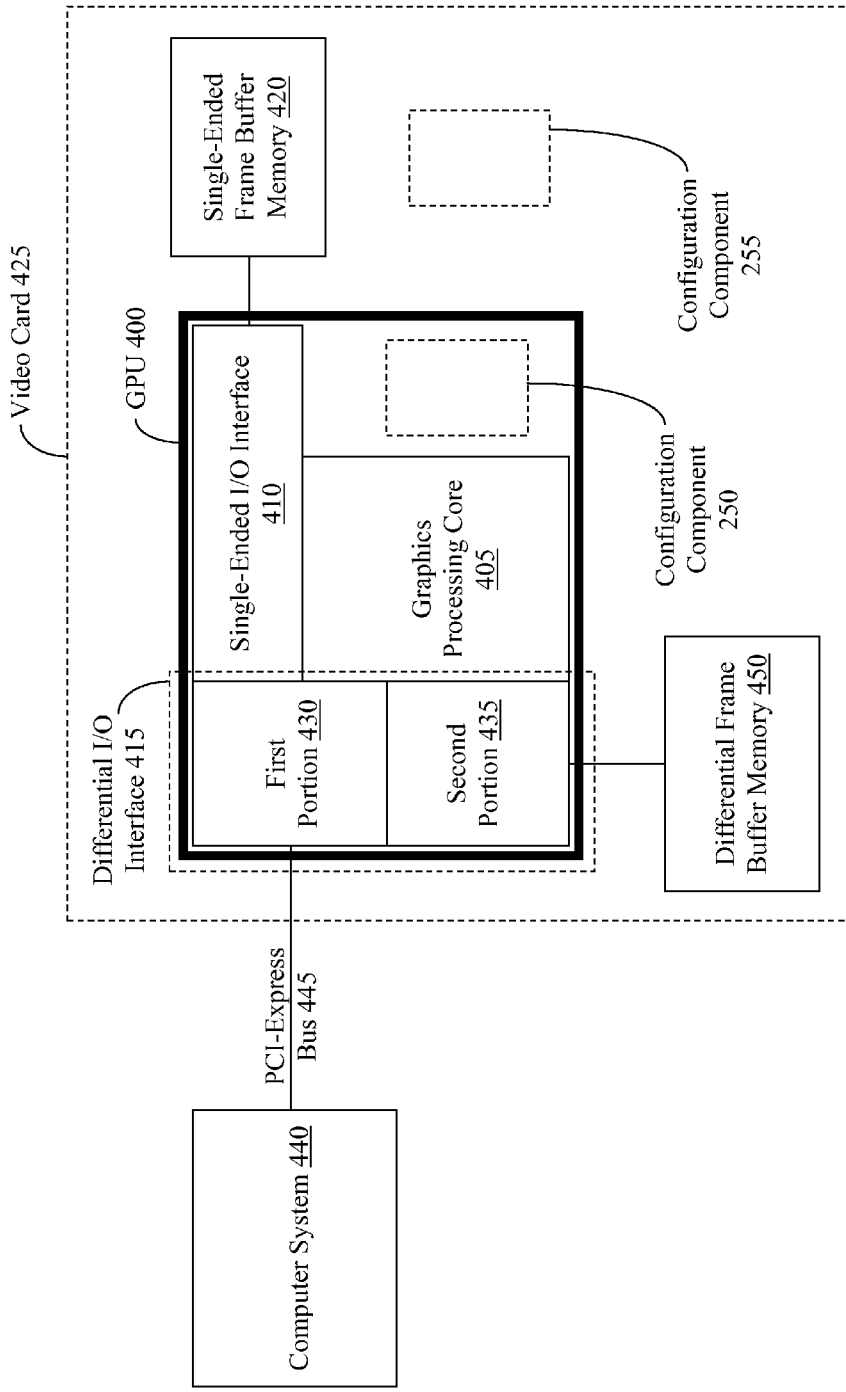
FIG. 4 shows a GPU in a second configuration in accordance with another embodiment of the present invention.

FIG. 4 shows GPU 400 in a second configuration in accordance with another embodiment of the present invention. GPU 400 is comprised of graphics processing core 405, single-ended I/O interface 410, and differential I/O interface 415.

Graphics processing core 405 is comprised of hardware optimized for real-time three-dimensional graphics rendering. More specifically, graphics processing core 405 comprises two or more graphics rendering pipelines configured to accept image data, and render the image data for display on a display device (e.g., CRT, LCD, etc.).

Differential I/O interface 415 is comprised of first portion 430 and second portion 435 in the second configuration shown in FIG. 4. First portion 430 forms a PCI-Express interface for communication with computer system 440 over PCI-Express bus 445. The PCI-Express interface transfers image data to graphics processing core 405 such that the image data may be rendered and displayed in accordance with embodiments of the present invention. Additionally, PCI-Express bus 445 may comprise a plurality of lanes, as discussed above with respect to FIG. 3, depending upon the bandwidth required for the given configuration.

In the second configuration, one embodiment of the present invention depicted in FIG. 4 utilizes both differential and single-ended frame buffer memory to perform graphics processing operations. As such, single-ended I/O interface 410 communicates with single-ended frame buffer memory 420 using single-ended signaling, and second portion 435 communicates with differential frame buffer memory 450 using differential signaling. Thus, GPU 400 may be integrated into products employing both differential and single-ended frame buffer memory, such as video card 425. However, it should be noted that in other embodiments, GPU 400 may be implemented as a discrete component, as a discrete integrated circuit die, or as an integrated GPU included within the integrated circuit die of a computer system chipset component. Similarly, single-ended frame buffer memory 420 and differential frame buffer memory 450 may be implemented in other embodiments as discrete components, which are removably coupled to video card 425.

Another embodiment of the present invention in the second configuration utilizes only differential frame buffer memory.

Consequently, in this embodiment, single-ended I/O interface is not utilized, and second portion 435 communicates with differential frame buffer memory 450 using differential signaling to perform graphics processing operations. As such, GPU 400 may be integrated into products employing solely differential frame buffer memory.

Figure 5:
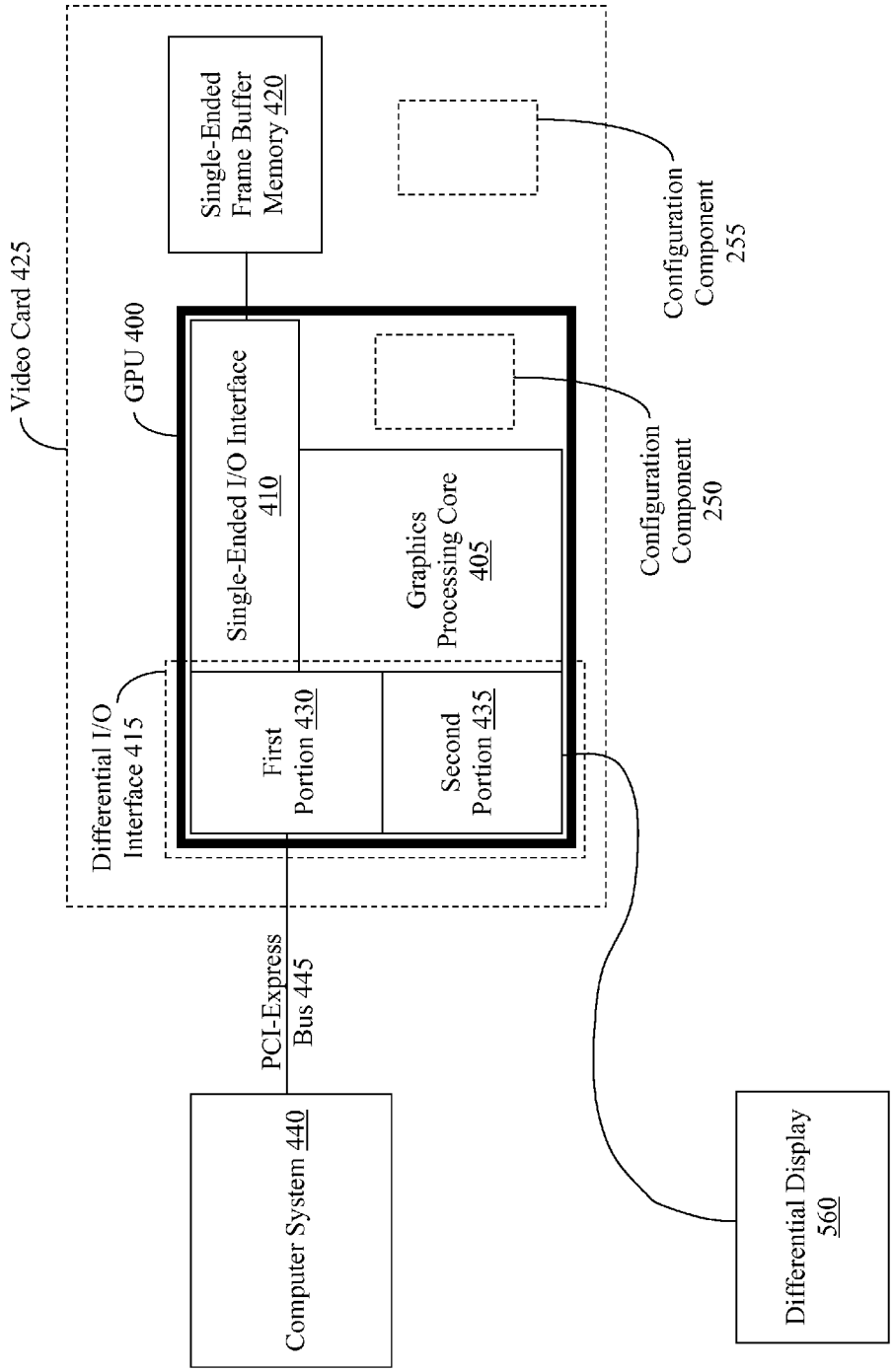
FIG. 5 shows a GPU in a second configuration in accordance with another embodiment of the present invention.

FIG. 5 shows GPU 400 in a second configuration in accordance with another embodiment of the present invention. As described above with respect to FIG. 4, GPU 400 is comprised of graphics processing core 405, single-ended I/O interface 410, and differential I/O interface 415. Single-ended I/O interface 410 communicates with single-ended frame buffer memory 420 using single-ended signaling to perform graphics processing operations. Additionally, differential I/O interface 415 is comprised of first portion 430 and second portion 435, where first portion 430 forms a PCI-Express interface for communication with computer system 440 over PCI-Express bus 445. However, unlike the embodiments discussed with regard to FIG. 4, second portion 435 communicates with differential display 560 using differential signaling to convey display data. The interface established between second portion 435 and differential display 560 can be in accordance with Displayport in one embodiment, and other differential signaling standards (e.g., TMDS, etc.) in other embodiments. Moreover, although FIG. 5 shows second portion 435 coupled to a differential display, it should be understood that GPU 400 may be configured such that second portion 435 is coupled to other differential devices (e.g., differential video I/O devices, differential audio I/O devices, differential storage devices, etc.).

Figure 6:
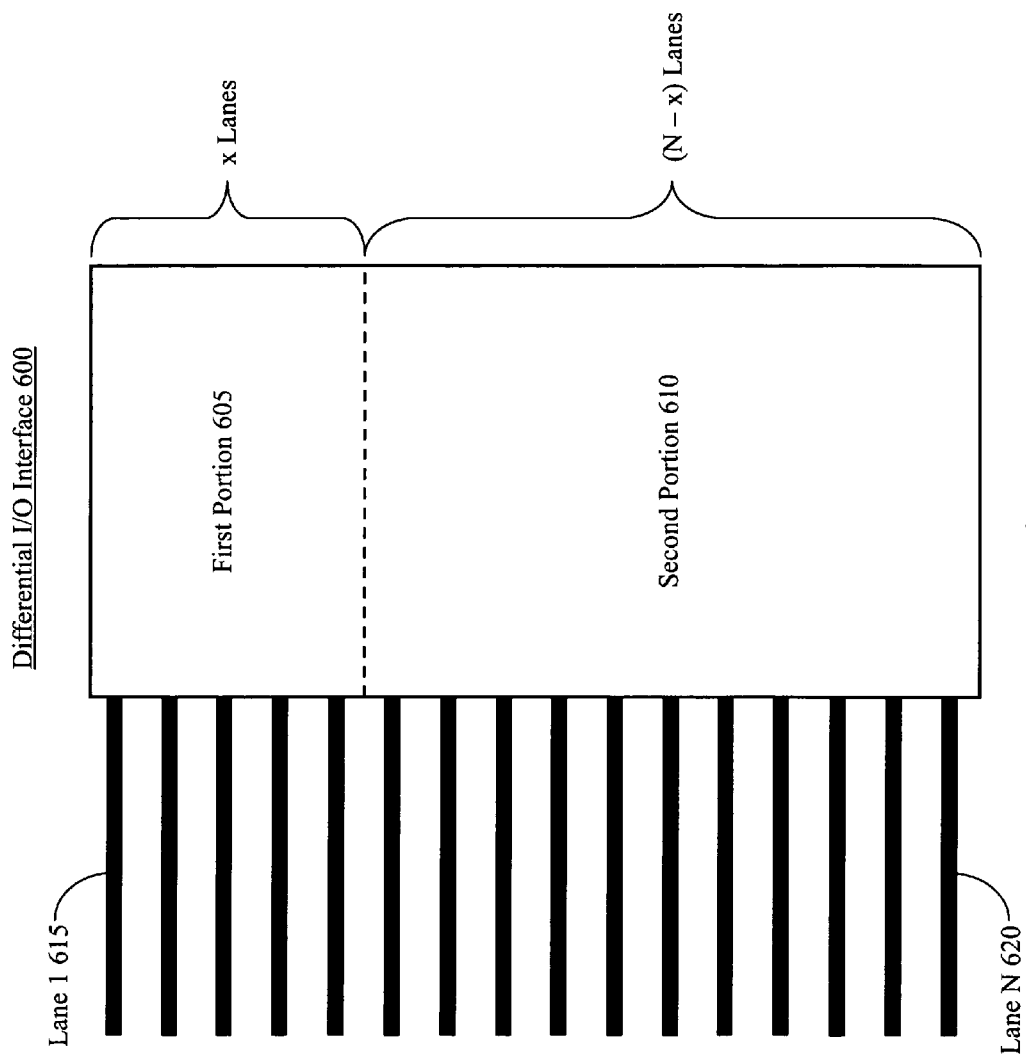
FIG. 6 shows differential I/O interface with a first portion and a second portion in accordance with one embodiment of the present invention.

FIG. 6 shows differential I/O interface 600 with first portion 605 and second portion 610. "N" number of lanes, beginning with Lane 1 615 and ending with Lane N 620, are shown leading to both first portion 605 and second portion 610. And more specifically, x number of lanes are shown in FIG. 6 leading to first portion 605, while (N−x) number of lanes are shown leading to second portion 610.

Thus, in accordance with embodiments of the present invention as shown in FIG. 6, the manufacturer can choose the total number of differential lanes leading to differential I/O interface 600. Not only does this provide significant manufacturing flexibility, but also allows the same integrated circuit device to be utilized in a wide variety of products. Additionally, embodiments of the present invention allow the manufacturer to section off a given number of lanes that are not needed in a given product line, such that the unneeded portion of differential I/O interface 600 can be used to implement differential communication with coupled devices (e.g., differential frame buffer memory, differential displays, etc.). Although the number of lanes leading to first portion 605 and second portion 610 are shown in a given proportion (e.g., fewer number of lanes leading to first portion 605 than second portion 610), it should be understood that the total number of lanes leading to differential I/O interface 600 may be divided in any proportion between first portion 605 and second portion 610. For example, in another embodiment the lanes may be divided equally between the two portions. And in other embodiments, fewer lanes may be brought to second portion 610 than first portion 605.

Referring back to FIGS. 2, 4 and 5, the ability to switch between embodiments of the present invention directed to the first and second configurations provide additional flexibility and utility to the manufacturer. Before implementing one of the embodiments of the present invention into a product, the manufacturer may select the desired configuration (e.g., using configuration component 250, configuration component 255, etc.) depending upon the needs of the given product line. This selection may be accomplished by setting a bit (e.g., configuration component 250) within the logic of the integrated circuit device, by cutting one or more fusible links (e.g., configuration component 250) on the integrated circuit die during manufacturing, by making changes to the component into which the integrated circuit device is integrated (e.g., configuration component 255), or the like. As such, the manufacturer is able to select a configuration with little added manufacturing cost.

In sum, embodiments of the present invention provide the manufacturer the flexibility to accommodate many different product variations with a single basic GPU design. Embodiments of the present invention allow the integration of single-ended frame buffer memory with other differential devices coupled to the GPU, while maintaining a PCI-Express interface for communication with other components of the computer system. Additionally, the manufacturer is able to make the selection between configurations with little added manufacturing cost. And when incorporating embodiments of the present invention into products utilizing the second configuration, the manufacturer is able to vary the number of differential signal paths leading to both the PCI-Express interface and the portion of the differential I/O interface dedicated to communication with coupled devices. Thus, the manufacturer is able to cater embodiments of the present invention to many different product designs, both existing and likely to appear in the future as computer systems continue to demand higher levels of performance from the GPU. And this flexibility is provided to the manufacturer without significantly increasing the size, complexity, or cost of the integrated circuit device.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A graphics processing unit comprising:
   a graphics processing core;
   a single-ended interface for implementing single-ended communication with a frame buffer memory; and
   a differential interface including a first portion and a second portion, wherein in a first configuration said first portion and said second portion are operable to implement a PCI-Express interface between said graphics processing core and a computer system, wherein in a second configuration said first portion is operable to implement a first interface between said graphics processing core and said computer system, wherein in said second configuration said second portion is operable to implement a second interface between said graphics processing core and a device, and wherein said differential interface is operable to simultaneously implement said first interface and said second interface in said second configuration.

2. The graphics processing unit of claim 1, wherein said graphics processing unit is embodied in an expansion interface device.

3. The graphics processing unit of claim 1, wherein said first configuration or said second configuration is selected as a manufacturing operation.

4. The graphics processing unit of claim 1, wherein said device is differential frame buffer memory.

5. The graphics processing unit of claim 1, wherein said device is a differential display.

6. The graphics processing unit of claim 1, wherein a selection between said first configuration and said second configuration is determined based upon a bit set in said graphics processing unit.

7. A method of operating a graphics processing unit, said method comprising:
 implementing single-ended communication with a frame buffer memory using a single-ended interface of said graphics processing unit;
 in a first configuration of said graphics processing unit, implementing a PCI-Express interface between a graphics processing core of said graphics processing unit and a computer system;
 in a second configuration of said graphics processing unit, implementing a first interface between said graphics processing core and said computer system;
 in said second configuration of said graphics processing unit, implementing a second interface between said graphics processing core and a device; and
 wherein said implementing said first interface and said implementing said second interface are performed simultaneously.

8. The method of claim 7, wherein said graphics processing unit is embodied in an expansion interface device.

9. The method of claim 7, further comprising selecting said first configuration or said second configuration as a manufacturing operation.

10. The method of claim 7, wherein said device is differential frame buffer memory.

11. The method of claim 7, wherein said device is a differential display.

12. A computer system comprising:
 a motherboard;
 a central processing unit;
 system memory;
 frame buffer memory; and
 a graphics processing unit comprising:
 a graphics processing core;
 a single-ended interface for implementing single-ended communication with said frame buffer memory; and
 a differential interface having a first portion and a second portion, wherein in a first configuration said first portion and said second portion are operable to implement a PCI-Express interface between said graphics processing core and a computer system, wherein in a second configuration said first portion is operable to implement a first interface between said graphics processing core and said computer system, wherein in said second configuration said second portion is operable to implement a second interface between said graphics processing core and a device, and wherein said differential interface is operable to simultaneously implement said first interface and said second interface in said second configuration.

13. The computer system of claim 12 further comprising:
 an expansion interface device; and
 wherein said graphics processing unit is included within said expansion interface device.

14. The computer system of claim 12, wherein said expansion interface device is a graphics card.

15. The computer system of claim 12, wherein a particular configuration is selected during manufacture of said expansion interface device, and wherein said particular configuration is selected from a group consisting of said first configuration and said second configuration.

16. The computer system of claim 12, wherein a particular configuration is selected using a configuration component of said expansion interface device, and wherein said particular configuration is selected from a group consisting of said first configuration and said second configuration, 17. The computer system of claim 12, wherein said device is differential frame buffer memory.

18. The computer system of claim 12, wherein said device is a differential display.

19. The computer system of claim 12, wherein said differential interface comprises a plurality of lanes.

20. The computer system of claim 12, wherein said first portion comprises a first subset of said plurality of lanes, and wherein said second portion comprises a second subset of said plurality of lanes.

21. The computer system of claim 12, wherein a selection between said first configuration and said second configuration is determined based upon a bit set in said graphics processing unit.

\* \* \* \* \*